Figure 1:
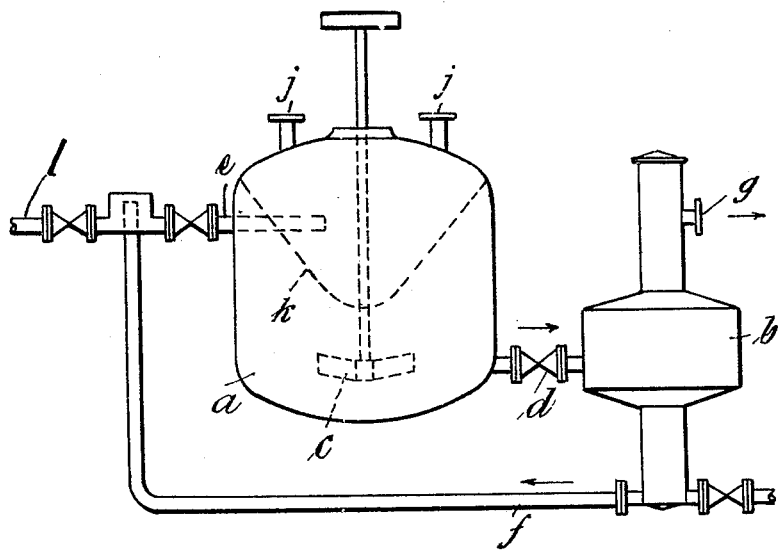

April 29, 1952 K. T. NORELL 2,594,675
LIQUID REACTOR
Filed March 28, 1949 2 SHEETS—SHEET 1

Inventor:
Karl Torvald Norell,
By: Pierce, Scheffler & Parker,

April 29, 1952  K. T. NORELL  2,594,675
LIQUID REACTOR

Filed March 28, 1949  2 SHEETS—SHEET 2

Inventor:
Karl Torwald Norell,
By: Pierce, Scheffler & Parker,
Attorneys

Patented Apr. 29, 1952

2,594,675

UNITED STATES PATENT OFFICE 2,594,675

LIQUID REACTOR

Karl Torvald Norell, Bofors, Sweden, assignor to Aktiebolaget Bofors, Bofors, Sweden, a Swedish corporation Application March 28, 1949, Serial No. 83,972
In Sweden November 19, 1945

4 Claims. (Cl. 23—270.5)

In the chemical industry operations are common, such as syntheses, washing operations and extractions, in which liquids which are insoluble in each other, have to be separated and, possibly, subjected to further treatment. The present invention relates to a simple equipment for carrying out such operations not only intermittently but also continuously.

One object of the invention is to build an apparatus comprising one treatment vessel and one stationary separator connected thereto in such a manner that one of two liquids to be treated, and which are not soluble in each other, will circulate through the treatment vessel and the separator by gravity and without the aid of any circulating means such as pumps or the like.

Another object of the invention is to build a combination apparatus comprising a plurality of treatment vessels and one stationary separator for each of such vessels, the combination being such that of the two liquids to be treated with each other one can be introduced in the first and the other one in the last of the treatment vessels of the series the liquids then flowing in countercurrent to each other between the treatment vessels and in parallel through said vessels, the flow of the liquids being caused only by gravity without the aid of any mechanical liquid transporting means such as pumps or the like.

A simple arrangement according to the invention consists of a treating vessel provided with an inlet, an outlet and a stirrer and a stationary separator connected to the treating vessel. Said separator consists of a vessel having an inlet at the midportion and top and bottom outlets, both these outlets being in the form of traps to prevent flow in the opposite direction. By connecting one of the outlets of the separator to the treating vessel one of the liquids taking part in the operation may be caused to circulate, whereas the other liquid is continuously tapped off. Such an arrangement may be particularly suitable in extracting or washing operations, as it may be desirable in one instance to make the extracting agent circulate in order to be enriched with extracted substance and in another instance it may be desirable to cause the liquid to be washed to circulate in order that the washing-out may be complete.

By combining several units of the simple arrangement above described it is possible, according to the invention, to provide an equipment which renders possible a continuous carrying-out of the operations in question in several steps, and, possibly, in treating in different steps different liquid mixtures or at least different concentrations of those liquids which are contained in the mixture.

If each treating vessel with the appertaining separator is termed an "apparatus unit," in the combination of several such units one outlet from a separator has to be connected to the treating vessel in the apparatus unit lying in front of it and the other outlet from the same separator is connected to the treating vessel in the apparatus unit lying behind it. In this case, one of the outlets from the separator in the first apparatus unit of such a series serves as a final outlet e. g. for consumed treating liquid, whereas one of the outlets from the separator in the last unit of the series serves as an outlet for the finished product. If the equipment is employed for countercurrent treatment of liquids which flow through the equipment by gravity, it is, of course, an indispensable condition that the different apparatus units of the series as well as the outlets from the separators be arranged at such levels that the liquid having the higher specific gravity will flow through the series in one direction and the liquid having the lower specific gravity will flow through in the opposite direction.

For this purpose the following conditions must be satisfied:

1. The pressure of the liquid column within the treatment vessel above the level of its connection to the separator must be greater than the pressure of the liquid columns between the same level and the two outlets of the separator.

2. The two separated liquid columns between said level of connection and the two outlets must be in equilibrium with each other, which is obtained by adjusting the difference of level between the two outlets in correspondence with the difference in specific gravity between the two liquids.

3. In spite of the higher liquid level necessary in the treatment vessel it must be possible to supply liquid from a separator outlet to said treatment vessel without the use of any pumps or the like. This is achieved according to the invention by making use of the stirring effect which causes the liquid surface within the treatment vessel to rise against the wall and to sink correspondingly towards the centre thereby forming a so called crater. The supply piping from the outlet of a separator to a treatment vessel is consequently extended through the liquid layer rising against the wall during stirring so as to certainly open above the liquid surface into the gas phase above the crater.

Figure 2:
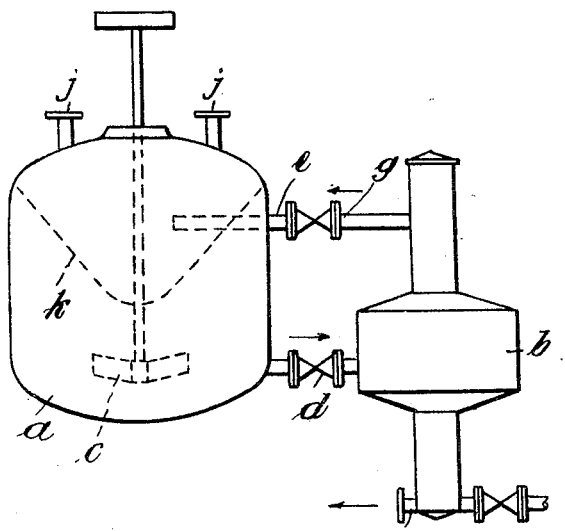
Figure 3:
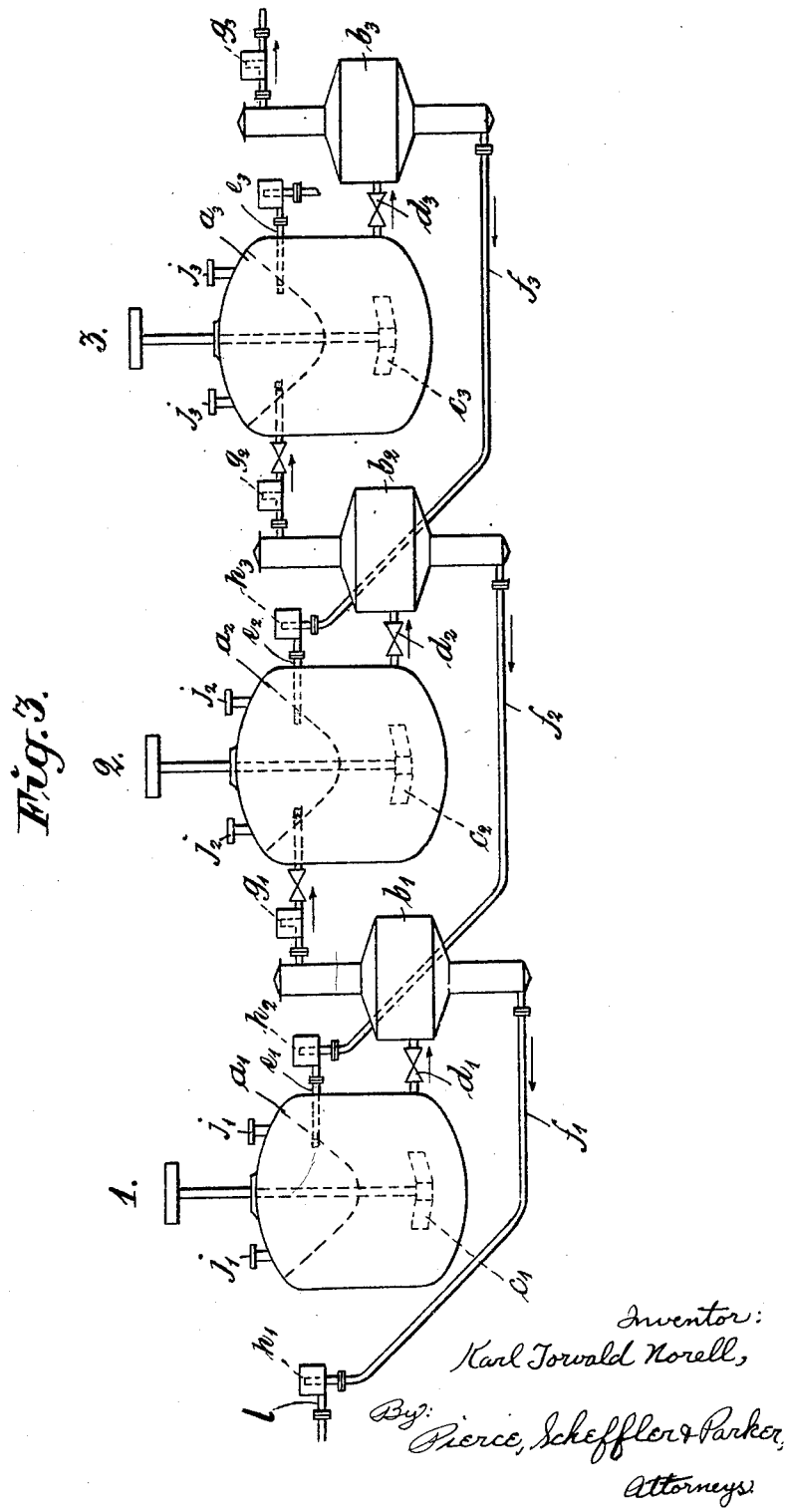

The invention will be described more in detail in the following with reference to the accompanying diagrammatical drawings, in which Figure 1 shows an apparatus unit arranged for circulation of the one or two liquids to be treated with each other which has the higher specific gravity and Figure 2 shows a similar apparatus unit arranged for circulation of the one of two liquids to be treated with each other having the lower specific gravity, and Figure 3 shows a combination of three apparatus units for carrying out the operations in question step-by-step.

In Figures 1 and 2, $a$ designates a treating vessel and $b$ a stationary separator. The treating vessel $a$ is provided with a stirrer $c$, and outlet $d$, which leads to the separator $b$, as well as an inlet $e$ which in the embodiment illustrated in Figure 1 is connected to the bottom outlet pipe $f$ of the separator $b$, and in the embodiment according to Figure 2 is connected to the top outlet $g$ of the separator $b$. The bottom outlet pipe $f$ is provided with the trap $h$ and the outlet $g$ may be similarly provided with a trap to prevent reverse flow. The treating vessel has a suitable number of pipe sockets or the like $j$ for the supply of the starting material or other chemicals or for the introduction of necessary instruments, e. g. thermometers, manometers, safety valves etc. As shown in the drawings, the pipe $e$ connected to one of the separator outlets extends so far into the treating vessel $a$ that its mouth will be positioned well above the level of the liquid, in the crater formed during the stirring, said crater being indicated by means of the reference character $k$. The return conduit from the separator to the treating vessel may, as shown at $l$ in Fig. 1, be equipped with a special discharge pipe, preferably provided with a cock or valve, for tapping off the liquid passing through this return conduit when the circulation of the same no longer is desired.

The operation of an apparatus according to Figure 1 is as follows, said apparatus being, by way of example, employed for complete washing-out of an impurity from a liquid by means of a washing liquid of lower specific gravity which is not soluble in the heavier liquid to be washed but is a selective solvent for the impurity in question. The heavier liquid is introduced to a suitable level into the treating vessel $a$, and the stirrer $c$ is started. Then the washing liquid is supplied continuously to the treating vessel and the valve in the outlet $d$ of the separator is opened. The mixture obtained in the treating vessel $a$ then flows continuously to the separator $b$ where separation takes place, the lighter washing liquid together with impurities dissolved therein passing away through the top outlet $g$, while through the bottom outlet $f$, the trap $h$ and the pipe $e$ the purified heavier liquid is returned to the treating vessel $a$ in which it is mixed with more of the pure washing liquid. When the washing-out is complete, the circulation is interrupted and the purified heavier liquid is tapped off, for instance through the tapping pipe $l$, and during said tapping off washing liquid may be supplied for effecting the required tapping-off pressure in the treating vessel $a$. Of course, the tapping-off may, however, also be effected through a special discharge pipe at the bottom of the separator.

The operation of the device according to Figure 2 is entirely equivalent with the exception that in this case the liquid of the lower specific gravity is allowed to circulate for instance while being enriched with substance extracted from the heavier liquid.

The device shown in Figure 3 consists, as stated above, of a combination of three apparatus units designated by 1, 2 and 3, respectively. In the following, these numbers are used also as indices for the reference characters of the different parts for the purpose of marking more clearly to which unit the different parts appertain.

Each unit consists of a treating vessel $a_1$, $a_2$ and $a_3$ and a stationary separator $b_1$, $b_2$ and $b_3$, respectively. Stirrers $c_1$, $c_2$ and $c_3$ are arranged in the treating vessels. Each treating vessel is connected to its appertaining separator by means of a valved piping $d_1$, $d_2$, $d_3$. The separators are provided with top outlets $g_1$, $g_2$, $g_3$, and with bottom outlets $f_1$, $f_2$, $f_3$. All discharge conduits $g_{1-3}$ and $f_{1-3}$ are, as indicated in the drawing, designed to form traps $m_1$, $m_2$ and $m_3$ and $h_1$, $h_2$ and $h_3$ respectively, in order to obviate the risk of return flow in any conduit, for instance on account of siphon or suction effect.

In order to make sure that return flow back to the separator through its bottom outlet pipe be avoided, the pipes $e_1$, $e_2$ leading from the traps $h_2$ and $h_3$ into treating vessels $a_1$ and $a_2$, respectively, lying in front have been extended so far that they will open into the crater formed in the appertaining treating vessel during the stirring. The different treating vessels $a_1$, $a_2$ and $a_3$ are also provided with a suitable number of pipe sockets $j_1$, $j_2$ and $j_3$, respectively, for the supply of starting material, auxiliary chemicals etc. as well as for the insertion of instruments, such as thermometers, manometers, safety valves and the like.

As appears from Figure 3 the top outlet $g_1$ of the separator $b_1$ in the apparatus unit designated by 1 is connected to the treating vessel $a_2$ in the apparatus unit 2, while its bottom outlet $f_1$ is connected to the treating vessel in an apparatus unit lying in front or to a storage tank or the like, or directly to a waste pipe in case the liquid passing therethrough need not be collected. The top outlet $g_2$ from the separator $b_2$ is connected to the treating vessel $a_3$ in the apparatus unit 3, while the bottom outlet $f_2$ of the same separator $b_2$ is connected to the treating vessel $a_1$ in the apparatus unit 1. The bottom outlet $f_3$ from the separator $b_3$ in the apparatus unit 3 is connected to the treating vessel $a_2$, while the top outlet $g_3$ from the same separator $b_3$ may be connected to an equipment for further treatment, to a collecting tank or, if the liquid passing away through this outlet is not to be collected, directly to a waste conduit.

The operation of the apparatus shown in Figure 3 will be more closely explained in the following, the production of trinitrotoluene having been selected as an example.

Through the inlet pipe socket $j_1$ there is continuously introduced toluene into the treating vessel $a_1$ where it is mixed in weak nitrating acid supplied from the separator $b_2$ through the bottom outlet pipe $f_2$, the trap $h_2$ and the pipe $e_1$. As a result, there is formed in the vessel $a_1$ mononitrotoluene which together with the residual nitrating acid flows through the conduit $d_1$ into the separator $b_1$. In this separator $b_1$ the mononitrotoluene, which is of lower specific gravity, is separated from the heavier nitrating acid and flows via the overflow $g_1$ into the treating vessel $a_2$, while the residual acid flows through the bottom outlet pipe $f_1$ to a storage tank or directly to a recovery or denitrating plant. In the treating vessel $a_2$ the mononitrotoluene is mixed with stronger nitrating acid coming from the separator $b_3$ through the bottom outlet pipe $f_3$ via the trap $h_3$ and across the delivery pipe $e_2$ and reacts to form dinitrotoluene. The mixture of dinitrotoluene with excess of nitrating acid flows continuously through the piping $d_2$ to the separator $b_2$ where the heavier nitrating acid is separated from the lighter dinitrotoluene in order to be introduced into the treating vessel $a_1$, while the dinitrotoluene flows via the outlet $g_2$ into the last treating vessel $a_3$ where it is mixed and brought into reaction with fresh nitrating acid to form trinitrotoluene which together with the excess of nitrating acid flows off through the conduit $d_3$ to the separator $b_3$ in order to be separated from the nitrating acid and to be conducted via the top outlet $g_3$ to a washing and re-crystallization plant, while in a manner already described the nitrating acid separated in the separator $d_3$ is introduced into the treating vessel $a_2$. If considered necessary, a further apparatus unit may of course be included after the separator $b_3$ for final nitration of possibly remaining incompletely nitrated products.

As appears from the above description, the lighter liquid, thus, due to its gravity flows continuously and while being transformed step-by-step, from toluene via mono and dinitrotoluene into trinitrotoluene through the equipment in the direction from the unit 1 via 2 to 3, while with successive weakening the nitrating acid, likewise on account of its gravity, flows through the equipment in opposite direction. If required, the suitable strength of the nitrating acid in each treating vessel $a_{1-3}$ may be adjusted through direct supply of fresh nitrating acid or of concentrated sulphuric acid (possibly fuming sulphuric acid) and nitric acid, respectively.

Of course, the equipment according to the invention may not only be used for nitrating operations but also for other kinds of reactions, such as esterifications, as well as for washing and extracting treatments, and it might be said that it is a universal equipment for carrying out countercurrent treatments of fluid media, which are not soluble in each other.

What I claim is:

1. Apparatus for contacting two liquids which are immiscible and of different densities comprising a stationary, substantially cylindrical vertically disposed treating vessel adapted to contain a body of liquid, a rotary stirrer positioned within said vessel at a substantial distance from the top thereof with its axis of rotation adjacent the vertical axis thereof, said stirrer being adapted to dip into said body of liquid and having blades so inclined that when rotated a substantially conical crater in said body of liquid is created, means for withdrawing liquid by gravity flow from said vessel at a level below the vortex of said crater; said means comprising a liquid outlet opening in the wall of the vessel located below said vortex, a liquid inlet to said vessel comprising a conduit extending substantially horizontally through the wall of said vessel to a point within said crater and at a substantial distance below the crest thereof, a stationary vertically disposed separating vessel positioned adjacent said treating vessel, said separating vessel having an outlet for liquid adjacent its upper end, an outlet for liquid adjacent its lower end and an inlet for liquid at a point intermediate its upper and lower ends, said inlet for liquid to said separating vessel being positioned at substantially the same level as the liquid outlet opening in said treating vessel and said outlet for liquid adjacent the upper end of said separating vessel being at least as high as the liquid inlet conduit to said treating vessel but below the crest of said crater, a conduit connecting the outlet opening in the wall of the treating vessel with the inlet of the separating vessel, a conduit connecting one only of the liquid outlets from said separating vessel to the liquid inlet to said treating vessel and means in the last named conduit permitting flow of liquid from the separating vessel to the treating vessel but automatically preventing flow of liquid in the opposite direction.

2. Apparatus as defined in claim 1 in which the liquid outlet adjacent the upper end of the separating vessel is connected by a conduit to the liquid inlet to the treating vessel.

3. Apparatus as defined in claim 1 in which the liquid outlet adjacent the lower end of the separating vessel is connected by a conduit to the liquid inlet to the treating vessel.

4. Apparatus comprising a series of units each as defined in claim 1 arranged side by side at substantially the same level in which each treating vessel excepting the first has two liquid inlets into the crater, the outlet adjacent the lower end of each separating vessel excepting the first of the series is connected by a conduit to a liquid inlet to the preceding treatment vessel of the series and the outlet adjacent the upper end of each separating vessel excepting the last is connected by a conduit to a liquid inlet to the succeeding treating vessel, and means in said conduits permitting flow of liquid from said outlets to said inlets but preventing flow in the reverse directions.

KARL TORVALD NORELL.

REFERENCES CITED

The following references are of record in the file of this patent:

UNITED STATES PATENTS

| Number | Name | Date |
|---|---|---|
| 1,297,170 | Holley et al. | Mar. 11, 1919 |